Patented Sept. 12, 1922.

1,429,174

UNITED STATES PATENT OFFICE.

ALBERT F. SULZER, OF ROCHESTER, NEW YORK, ASSIGNOR TO EASTMAN KODAK COMPANY, OF ROCHESTER, NEW YORK, A CORPORATION OF NEW YORK.

NITROCELLULOSE COMPOSITION.

No Drawing.   Application filed February 23, 1921. Serial No. 447,245.

*To all whom it may concern:*

Be it known that I, ALBERT F. SULZER, a citizen of the United States of America, residing at Rochester, in the county of Monroe and State of New York, have invented certain new and useful Improvements in Nitrocellulose Compositions, of which the following is a full, clear, and exact specification.

This invention relates to a composition of matter in which cellulose nitrate is combined or mixed with other substances, so that the resulting product can be advantageously used in such arts as film manufacture and varnish manufacture.

One object is to produce a composition which may be made into permanently transparent, strong and flexible sheets or film of desired thinness, that are substantially waterproof, are unaffected by ordinary photographic fluids and possess the desired properties of a support for sensitive photographic coatings. Other objects will hereinafter appear.

I have discovered that a composition of matter having the desirable qualities can be prepared by combining nitrocellulose with ethyl butyrate within a certain range of proportions. Moreover, I have found that the ethyl butyrate as thus combined may be advantageously used in conjunction with mono hydroxy aliphatic alcohols of from 4 to 5 carbon atoms, normal butyl alcohol being the one that is preferred.

The ingredients are combined by the use of a common solvent present in sufficient amount to make a viscous flowable solution, the viscosity being varied by the amount of such solvent, as will be understood by those skilled in the art.

The ingredients are of the commercial grade, sufficiently purified to yield films of the desired transparency and relative freedom from color. I prefer the normal ethyl butyrate.

I find that ethyl butyrate, when employed in flowable solutions, as distinguished from plastic masses operated upon by heated rolls, can be combined with cellulose nitrate advantageously if it is present in the proportion of 1 to 100 parts for each 100 parts of the cellulose nitrate. The mono hydroxy aliphatic alcohol having from 4 to 5 carbon atoms, preferably normal butyl alcohol, may be usefully present in a wide range of proportions, from 10 to 100 parts for each 100 parts of cellulose nitrate being good practice. For a common solvent, I prefer to use methyl alcohol or acetone, or a mixture of these two in any proportion, although other volatile common solvents may be usefully substituted. While a person skilled in the art may greatly vary the amount of volatile solvent to suit his individual needs, I find that 650 parts thereof in proportion to each 100 parts of cellulose nitrate yields a useful composition for film manufacture. The ingredients are mixed until the combination is sufficiently homogeneous and may be filtered if desired.

The ethyl butyrate and normal butyl alcohol function together particularly well in the use of this composition, because their boiling points and, consequently, their volatilities are very nearly the same under parallel conditions. When the solution is flowed during film manufacture in the usual way, the volatile common solvent passes off rapidly to cause the film to set. But considerable amounts of the butyl alcohol and ethyl butyrate remain in the film, imparting to it characteristic flexibility. Since ethyl butyrate has a considerable specific solvent action on nitrocellulose and since it evaporates at practically the same rate as butyl alcohol, the setting of the film takes place under conditions which yield a particularly uniform film free from precipitation.

Having thus described my invention, what I claim as new and desire to secure by Letters Patent is:

1. A liquid composition of matter for forming film by flowing and drying, comprising cellulose nitrate and a mono hydroxy aliphatic alcohol having from 4 to 5 carbon atoms, ethyl butyrate and sufficient common solvent to make a viscous flowable solution.

2. A liquid composition of matter for forming film by flowing and drying, comprising cellulose nitrate, normal butyl alcohol, ethyl butyrate and sufficient common solvent to make a viscous flowable solution.

3. A liquid composition of matter for forming film by flowing and drying, comprising 100 parts of cellulose nitrate, 10 to 100 parts of a mono hydroxy aliphatic alcohol having from 4 to 5 carbon atoms, from 1 to 100 parts of ethyl butyrate and sufficient common solvent to make a viscous flowable solution.

4. A liquid composition of matter for forming film by flowing and drying, comprising 100 parts of cellulose nitrate, from 10 to 100 parts of normal butyl alcohol, from 1 to 100 parts of ethyl butyrate, and sufficient common solvent to make a viscous flowable solution.

5. As an article of manufacture, a strong, flexible, transparent film formed by flowing and drying a liquid composition, said film containing cellulose nitrate and sufficient ethyl butyrate to impart flexibility thereto.

6. As an article of manufacture, a strong, flexible, transparent film, formed by flowing and drying a liquid composition, comprising nitrocellulose, ethyl butyrate and normal butyl alcohol.

Signed at Rochester, New York, this 17th day of February, 1921.

ALBERT F. SULZER.